G. W. PRESTON.
Hitching Post.
No. 71,059.
Patented Nov. 19, 1867.
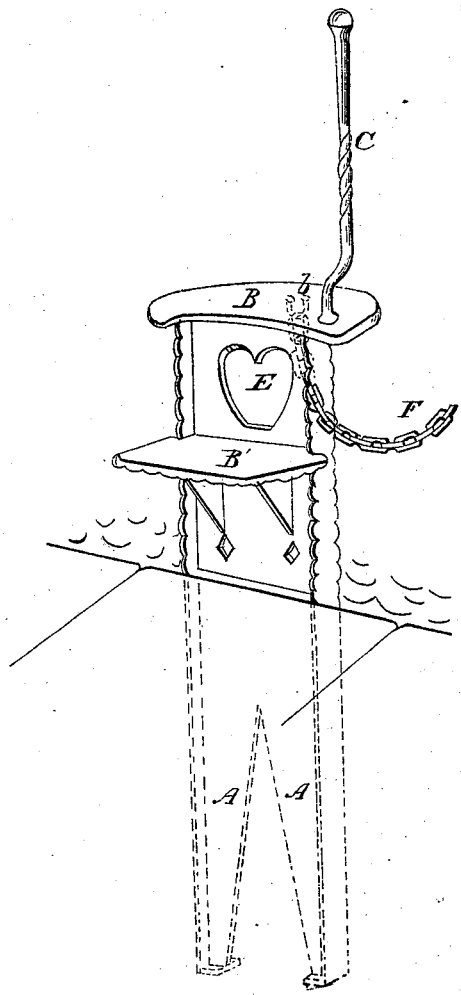

United States Patent Office.

GEORGE W. PRESTON, OF CORNING, NEW YORK.

Letters Patent No. 71,059, dated November 19, 1867.

---

IMPROVED HORSE-BLOCK AND HITCHING-POST.

---

The Schedule referred to in these Letters Patent and making part of the same.

---

TO ALL WHOM IT MAY CONCERN:

Be it known that I, GEORGE W. PRESTON, of Corning, in the county of Steuben, and State of New York, have invented a new and improved Combined Horse-Block and Hitching-Post; and I do hereby declare that the following is a full, clear, and exact description thereof, which will enable others skilled in the art to make and use the same, reference being had to the accompanying drawing, forming a part of this specification.

This invention, which relates to a combined horse-block and hitching-post, consists essentially in combining in one device, made of cast iron or other suitable material, a horse-block and hitching-post. The device is intended for use in pairs, to be set at about ten feet apart, so that when the horse is hitched to one, the buggy will be at the other.

The accompanying drawing is a perspective view of my device.

The post is intended to be of cast iron or other suitable material, about four (4) feet seven (7) inches in length, separated at the lower portion for about two (2) feet of its length, as shown in the drawing at A A, and to be set about two (2) feet seven (7) inches into the ground. B B¹ are two steps, the upper, B, about twenty-one inches in length and ten inches wide, and having attached to it the wrought-iron hand-post C, about two feet in height, with cast-iron knobs on top. The lower step, B¹, is about four inches shorter, but of the same width as B. These dimensions may be varied as desired, as well as the material of which the post is constructed. The material is cut away at E to form a scraper, as shown. F is a chain for hitching the vehicle, and is attached to the under side of B at b. When the posts are used in pairs, the horse being driven to one post and hitched thereto by the chain F, the vehicle is at the other post, situated about ten feet apart, when the parties alight. When used in pairs, the hand-posts are put on right and left handed, and the posts are set in the ground with the hand-posts towards each other.

I claim as new, and desire to secure by Letters Patent—

1. The combined horse-block and hitching-post, substantially as above set forth and described.

2. The said combined horse-block and hitching-post, in combination with the hand-rail C, substantially as described.

3. The said combined horse-block and hitching-post, in combination with the scraper E, substantially as described.

The above specification of my invention signed by me this 11th day of September, 1867.

GEO. W. PRESTON.

Witnesses:
 GEO. HEERMANS,
 M. M. CAMPBELL,